United States Patent Office.

JOSEPH D. LOFTUS, OF CHELSEA, MASSACHUSETTS.

Letters Patent No. 60,759, dated January 1, 1867.

IMPROVEMENT IN CONCENTRATING SULPHURIC ACID.

*The Schedule referred to in these Letters Patent and making part of the same.*

TO ALL WHOM IT MAY CONCERN:

Be it known that I, JOSEPH D. LOFTUS, of England, residing at Chelsea, in the county of Suffolk, and State of Massachusetts, have invented an Improvement in Concentrating Sulphuric Acid; and I do hereby declare that the following, taken in connection with the drawings which accompany and form part of this specification, is a description of my invention sufficient to enable those skilled in the art to practise it.

The invention relates to the manufacture of sulphuric acid for use in the arts, or more particularly to the concentration of such acid. The method now practised is to concentrate the acid in leaden pans up to a given density, or to the limit of safety, such acid being sufficiently strong for many purposes. But when greater density is required, the concentration is continued in platinum or glass pans, platinum pans being the more practical. But the density acquired by this concentration does not reach a point beyond a specific gravity of 66° of Baume's hydrometer, and a still greater density is very desirable for certain manufacturing purposes. Now I have discovered that by concentrating the acid in iron pans I can acquire a density of 67° specific gravity, Baume's scale, and the product of the condensation is a perfectly colorless acid, much superior, for certain purposes, to acid concentrated in glass or platina, while the iron vats or pans are very inexpensive, as compared to platina vessels. My invention consists, therefore, in the employment of iron vats or pans for the concentration and distillation of sulphuric acid.

The process I prefer to use is as follows: The acid being first concentrated up to a specific gravity corresponding to 62° or 63° of Baume's scale, is run into a cast-iron or malleable-iron still, and concentrated by means of a fire placed under the bottom and around the sides of the still, the vapors being carried off and condensed by means of a worm of condensation. Or the acid may be concentrated by means of being heated from the surface, or by forcing heated air into it, or in any other way that the concentration may be effected, in cast, wrought, or malleable-iron vessels or stills, which is the main purpose of the invention. It will be obvious that this process may be used either in the primary manufacture of sulphuric acid, or for the improvement of the acid of commerce.

I claim, in the process of concentration or distillation of sulphuric acid, the employment of iron vessels or tanks, substantially as set forth.

J. D. LOFTUS.

Witnesses:
R. G. LOFTUS,
GEO. T. STODDARD.